Figure 1:
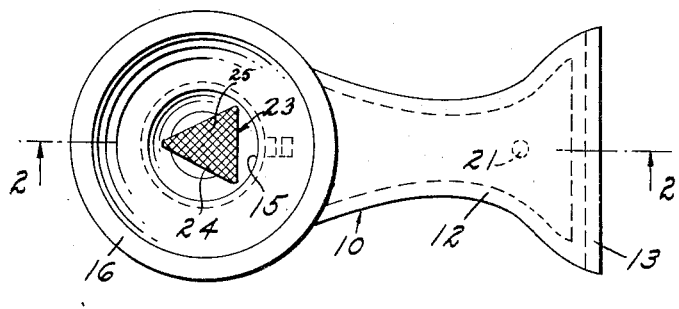
Figure 2:
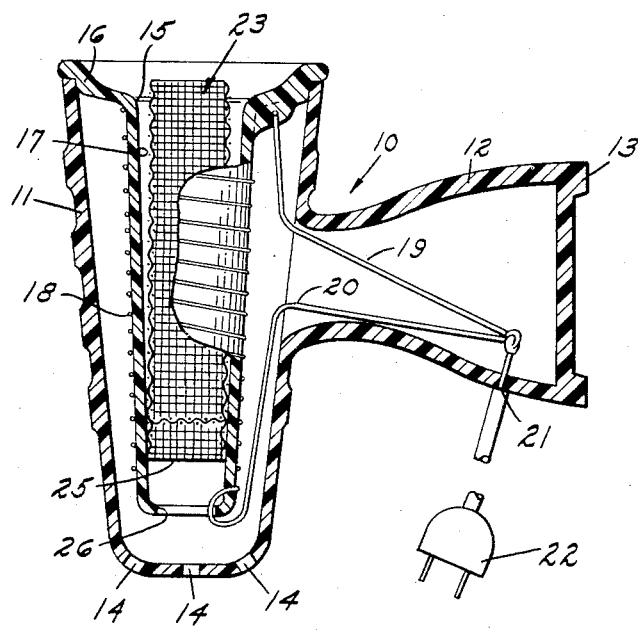

April 21, 1959     L. E. KOPECKY     2,882,640
LINDANE VAPORIZER
Filed Nov. 16, 1956

INVENTOR.
LOUIS E. KOPECKY
BY
Barnes, Kisselle, Laughlin & Raisch
ATTORNEYS

United States Patent Office 2,882,640
Patented Apr. 21, 1959

2,882,640

LINDANE VAPORIZER

Louis E. Kopecky, Hollister, Mo.

Application November 16, 1956, Serial No. 622,628

5 Claims. (Cl. 43—129)

This invention relates to vaporizers and particularly to vaporizers which are used to vaporize an insecticide such as lindane for killing insects and disinfecting large areas such as warehouses.

An effective insecticide for killing insects and disinfecting large areas is lindane, the gamma isomer of benzene hexachloride or 1,2,3,4,5,6-hexachlorocyclohexane. When vaporized, this insecticide is odorless and invisible. The devices which are presently used for vaporizing such insecticides comprises a holder consisting of a cup which includes a flat electrically heated plate on which the insecticide is placed. When electric current is supplied to the plate, the normally dry solid insecticide is liquified and evaporated. Such devices serve to vaporize some of the lindane but have certain disadvantages. For example, excessive heating of lindane results in the formation of harmful oxides, wasteful oxidation of a portion of the lindane and a reversion to some extent to the parent compound benzene hexachloride.

It is an object of this invention to provide a vaporizer which will efficiently vaporize lindane without formation of a liquid.

It is a further object of this invention to provide such a vaporizer which will vaporize lindane with a relatively small amount of heat.

It is a further object of this invention to provide such a vaporizer which will efficiently distribute the lindane vapors into the atmosphere.

In the drawings:

Fig. 1 is a plan view of the vaporizer.

Fig. 2 is a sectional view taken along the line 2—2 in Fig. 1.

As shown in the drawings, the vaporizer 10 comprises a body of ceramic or plastic material which includes a hollow open-ended cup 11 provided with an integral hollow holder or bracket 12 extending from one side thereof and provided with means designated 13 for mounting the vaporizer on a wall with the open end of cup 11 extending upwardly. Cup 11 is formed with openings 14 at the base thereof which permit the ingress of air, as presently described. The inside surface of cup 11 tapers upwardly and outwardly. The body may also be made of pressed sheet metal or high heat-resistant plastics.

A ceramic or plastic tube 15 is provided within cup 11 and is supported therein by a peripheral flange 16 on the upper end thereof which engages the upper end of cup 11. Tube 15 is generally cylindrical and the inner surfaces 17 thereof taper or diverge upwardly. A resistance coil 18 is wound around the entire length of tube 15. Ends 19, 20 of the coil extend through hollow holder 12 and thereafter through an opening 21 in holder 12 to the exterior of the vaporizer. An electric plug 22 is attached to the end of the wires 19, 20 so that the plug may be connected to an electric outlet in order to energize resistance coil 18.

A holder 23 for the chemical lindane is positioned within tube 15. Holder 23 is made of wire mesh defining a basket which is, as shown in Fig. 1, generally triangular in cross section and comprises sides 24 and a bottom 25 with the upper end of the holder 23 being open. The lower end of tube 15 is provided with an opening 26. As shown in Fig. 2, the cross sectional area of holder 23 is such, relative to the internal area of the lower end of tube 15, that the holder 23 is frictionally retained within tube 15. Holder 23 is preferably made of brass, which does not stimulate oxidation of lindane in the presence of heat. Fibre glass mesh or other synthetic materials may be used if they are stable when exposed to heat and do not react chemically with lindane.

In use, the vaporizer is mounted on a wall or other member in the area which is to be disinfected with tube 15 in generally vertical position. The insecticide in the form of crystals of lindane is poured into holder 23 and plug 22 is inserted in an electric outlet causing resistance coil 18 to be energized. The coil 18 applies heat uniformly to the material in the holder 23. The lindane crystals in holder 23 are thereupon vaporized by sublimation, rise because of their inherent heat and pass into the atmosphere providing a mixture with air which is deadly to insects. The upward movement of the lindane vapors and the air entering through openings 14 in the base of cup 11 result in the formation of convection currents which move upwardly through openings 14 and opening 26 in tube 15 through the lindane in holder 23 and out the upper end of tube 15 causing further sublimation of the lindane. The cup 11 serves to retain sufficient heat around tube 15 and holder 23 and also assists in controlling the convection currents.

By this arrangement, there is a complete utilization of the lindane without causing any portion thereof to be liquified. In addition, no portion of the lindane is excessively heated and, as a result, the formation of harmful oxides is eliminated and there is no wasteful oxidation. In addition, the lindane does not revert to the parent compound benzene hexachloride.

I claim:

1. In a vaporizer for lindane, the combination comprising a generally cup-shaped body having an open end, said body being adapted to be mounted in vertical position with the open end thereof extending upwardly, said body having air intake openings adjacent the lower end thereof, a tube mounted within said body and extending generally vertically, electrical heating means adapted to heat the lindane comprising a resistance coil wound around said tube, and a perforated holder for lindane mounted within said tube, said perforated holder being generally non-circular in cross section, the internal surface of said tube tapering upwardly and the internal diameter of the lower end of said tube being such that the lower end of said holder is wedged into and supported by said tube.

2. In a vaporizer for lindane, the combination comprising a generally cup-shaped body having an open end, said body being adapted to be mounted in vertical position with the open end thereof extending upwardly, said body having air intake openings adjacent the lower end thereof, a tube mounted within said body and extending generally vertically, electrical heating means adapted to heat the lindane comprising a resistance coil wound around said tube, and a perforated holder for lindane mounted within said tube, the internal surface of said tube being generally circular and tapering upwardly, said perforated holder being generally triangular in cross section, the internal diameter of the lower end of said tube being such that the lower end of said holder is wedged into and supported by said tube.

3. In a vaporizer for lindane, the combination comprising a generally cup-shaped body having an open end and adapted to be mounted in vertical position with the open end thereof extending generally upwardly, said body having intake openings adjacent the lower end thereof, a tube having an upper peripheral flange engaging the upper end of said body and thereby supporting said tube within said body with the axis thereof extending generally vertically, said tube being in spaced relationship to said body thereby defining a generally annular space between said tube and said body, said peripheral flange closing the upper end of said annular space, electrical heating means adapted to heat the lindane comprising a resistance coil wound around said tube, and a perforated holder for chemicals lindane mounted within said tube, the length of said tube being several times its diameter, the length of said holder being several times its largest cross-sectional dimension, said holder having portions of the side walls thereof spaced from the inner surface of said tube, whereby air may circulate between said holder and said tube.

4. In a vaporizer for lindane, the combination comprising a tube, means for mounting said tube in a generally vertical position, said tube being open ended whereby air may be passed therethrough in a vertical direction, electrical heating means adapted to heat the lindane comprising a resistance coil wound around said tube, and a perforated holder for lindane mounted within said tube, said perforated holder being generally non-circular in cross section, the internal surface of said tube tapering upwardly and the internal diameter of the lower end of said tube being such that the lower end of said holder is wedged into and supported by said tube.

5. In a vaporizer for lindane, the combination comprising a tube, means for mounting said tube in a generally vertical position, said tube being open ended whereby air may be passed therethrough in a vertical direction, electrical heating means adapted to heat the lindane comprising a resistance coil wound around said tube, and a perforated holder for lindane mounted within said tube, the length of said tube being several times its diameter, the length of said holder being several times its largest cross-sectional dimension, said holder having portions of the side walls thereof spaced from the inner surface of said tube, whereby air may circulate between said holder and said tube.

References Cited in the file of this patent

UNITED STATES PATENTS

| | | |
|---|---|---|
| 2,472,992 | Szekely | June 14, 1949 |
| 2,660,828 | Abrams | Dec. 1, 1953 |
| 2,690,500 | Winberg et al. | Sept. 28, 1954 |
| 2,742,342 | Dew et al. | Apr. 17, 1956 |
| 2,743,548 | Christopher et al. | May 1, 1956 |